(12) United States Patent
McKinney et al.

(10) Patent No.: US 6,688,648 B2
(45) Date of Patent: Feb. 10, 2004

(54) CARRIER FOR INFORMATION STORAGE UNIT AND METHOD

(75) Inventors: Warren McKinney, Naperville, IL (US); Gary White, Naperville, IL (US); Steve Pasek, Tinley Park, IL (US)

(73) Assignee: The Form House, Inc., Bedford Park, IL (US)

( * ) Notice: Subject to any disclaimer, the term of this patent is extended or adjusted under 35 U.S.C. 154(b) by 0 days.

(21) Appl. No.: 09/888,947

(22) Filed: Jun. 25, 2001

(65) Prior Publication Data

US 2002/0195814 A1 Dec. 26, 2002

(51) Int. Cl.[7] ............................................. B42D 19/00
(52) U.S. Cl. .................. 281/12; 206/232; 206/308.1; 206/387.13; 281/3.1; 281/15.1; 283/63.1
(58) Field of Search ................... 281/3.1, 12, 15.1, 281/29, 31, 36, 37, 38; 283/61, 62, 63.1, 64; 206/232, 308.1, 308.3, 309, 312, 387.13

(56) References Cited

U.S. PATENT DOCUMENTS

| | | | |
|---|---|---|---|
| 4,492,306 A | 1/1985 | Cooper et al. | |
| 4,988,124 A | 1/1991 | Hudetz | |
| 5,031,772 A | 7/1991 | Woodriff | |
| 5,098,127 A | 3/1992 | Williamson et al. | |
| 5,197,599 A | * 3/1993 | Dolan | 132/333 |
| 5,269,563 A | 12/1993 | Michlin | |
| 5,590,912 A | 1/1997 | Stevens | |
| 5,638,953 A | 6/1997 | House | |
| 5,713,605 A | 2/1998 | Pace et al. | |
| 5,782,349 A | * 7/1998 | Combs | 206/232 |
| 5,857,565 A | * 1/1999 | Baker et al. | 206/232 |
| 5,881,538 A | 3/1999 | Blohm | |
| 5,950,401 A | 9/1999 | Blohm et al. | |
| 5,975,579 A | * 11/1999 | Iggulden | 206/232 |
| 6,126,201 A | 10/2000 | Pace et al. | |
| 6,213,303 B1 | 4/2001 | Harris et al. | |

* cited by examiner

Primary Examiner—Monica S. Carter
(74) Attorney, Agent, or Firm—Blackwell Sanders Peper Martin, LLP

(57) ABSTRACT

An assembly of a carrier and an information storage unit for attachment to a publication. The assembly includes a support panel and a cover secured thereto and forming a pouch for receipt of a storage unit therein. The assembly is adapted for securement in a publication.

40 Claims, 4 Drawing Sheets

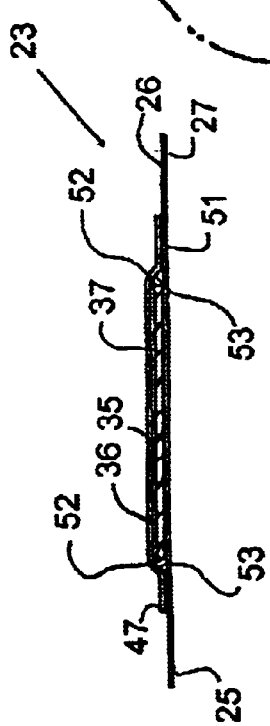
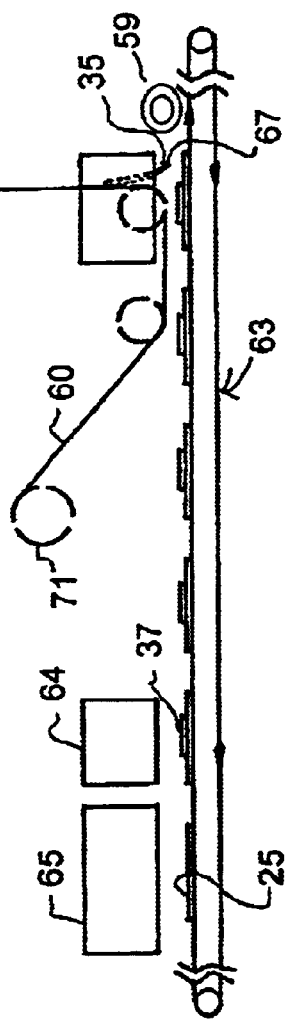

CARRIER FOR INFORMATION STORAGE UNIT AND METHOD

BACKGROUND OF THE INVENTION

Numerous devices have been utilized in the past for permitting the inclusion of an information storage unit such as a CD-ROM, DVD, diskette, floppy disk, etc. with a publication for example, a periodical, magazine, newspaper, book or the like. Typically, the inclusion of such a storage unit with a publication is for promoting the publication, or a manufacturers' products and/or can be an integral part of the publication for example, a textbook having a coordinated block of information contained in the storage unit. Examples of such units in combination with publications may be found in U.S. Pat. Nos. 5,782,349; 5,881,538; 6,126,201; 5,269,563; and 5,638,953. Another way of including a storage unit with a publication is to overwrap the publication with an outer cover and include the storage device within the composite package. This latter form of structure increased the mailing charges whereas those devices that were bound inside a publication had a smaller increase in the mailing charges over the cost of mailing the publication alone.

Some of the problems with carriers such as those disclosed in the above referenced patents is that they are of complicated structure, costly to manufacture, inconvenient for a consumer to open, or expensive and difficult to bind into a publication. Further, because of the complexity of structure, a significant amount of material was required which increased the cost of the structure. Many of these carriers do not permit viewing of the graphics on the storage unit, limiting consumer appeal and effective marketing. Additionally, the carriers do not permit or are not well adapted to permit use for subsequent storing of the storage device.

There is therefore a need for a simpler, less expensive and easier to use carrier for storage units which can be distributed in publications for distributing storage units through the mail or the like.

SUMMARY OF THE INVENTION

The present invention involves the provision of a carrier for storing an information storage unit for inclusion in a publication such as a magazine, book, periodical, etc. The carrier involves a panel which is adapted for securement to or within the publication. A cover is provided that is secured around at least a substantial portion of the outer periphery of the cover forming a pouch between the panel and the cover for receipt of an information storage unit such as a CD-ROM therein. The storage unit is preferably a device that is used to store information, data, software programs and the like in digital or other electronic form. The size and shape of the pouch closely approximates the size and shape of the storage device. A tear strip is provided in the cover and is positioned adjacent to a peripheral edge of the storage unit and the perimeter of the pouch such that when the tear strip is severed from the cover an opening is provided adjacent to the peripheral edge of the storage unit to facilitate removal of the storage unit from the pouch while leaving a pouch adequate for subsequent storing of the storage unit.

The present invention also involves the provision of a method of assembling a storage unit carrier with the storage unit in place in a pouch. A panel is fed along a processing line and a storage device is placed thereon at a predetermined location. A cover is subsequently removed from a feed strip containing covers. A cover is removed preferably by blowing a loose edge free from the feed strip after which the cover is applied to the panel by adhering an adhesive coated section of the cover onto the panel. Prior to application of the cover to a panel, a tear strip is provided therein having a finger tab with the tear strip preferably not being adhesively secured to the panel.

These and other objects, features and advantages of the present invention will be clearly understood from the following detailed description.

BRIEF DESCRIPTION OF THE DRAWINGS

For a better understanding of the present invention, reference may be made to the accompanying drawings.

FIG. 5 is a section view taken along the line 5—5 of FIG. 3.

FIG. 6 is a schematic diagram showing details of a process line for assembling carriers.

Similar numbers throughout the drawings designate like or similar parts.

DETAILED DESCRIPTION

Figure 1:
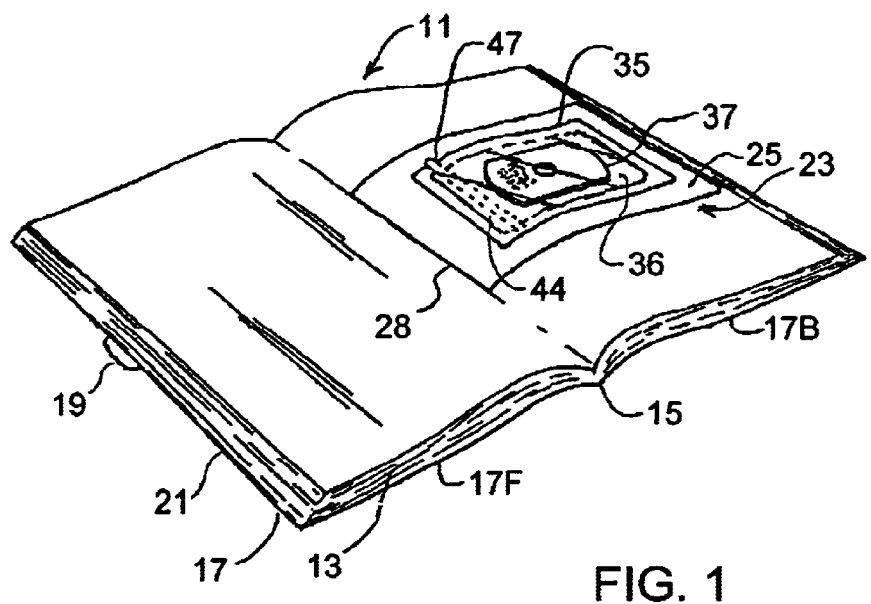
FIG. 1 is a perspective view of a publication having bound therein a storage device carrier.

The referenced numeral 11 designates generally a publication such as a book, magazine, newspaper, periodical or the like having a plurality of pages 13 that are bound together at an edge 15 such as by saddle stitching, stapling, gluing, etc. The publication includes a cover 17. The pages 13 and cover 17 (including front and back components 17F, 17B respectively) are in the case of a magazine typically folded at the middle to form the edge 15 at which the binding of the pages is accomplished. Such publications and assembly methods are well known in the art. When mailed, a closure 19 can be provided to ensure that the publication stays in its closed condition, i.e., the pages 13 and cover 17 do not open during shipping. Typically, such a closure 19 is an adhesively backed piece of paper or plastic that is secured to and bridges between the front and back covers of the publication. To open, a consumer simply breaks the closure 19 adjacent the free edges 21 of the pages 13.

Figure 3:
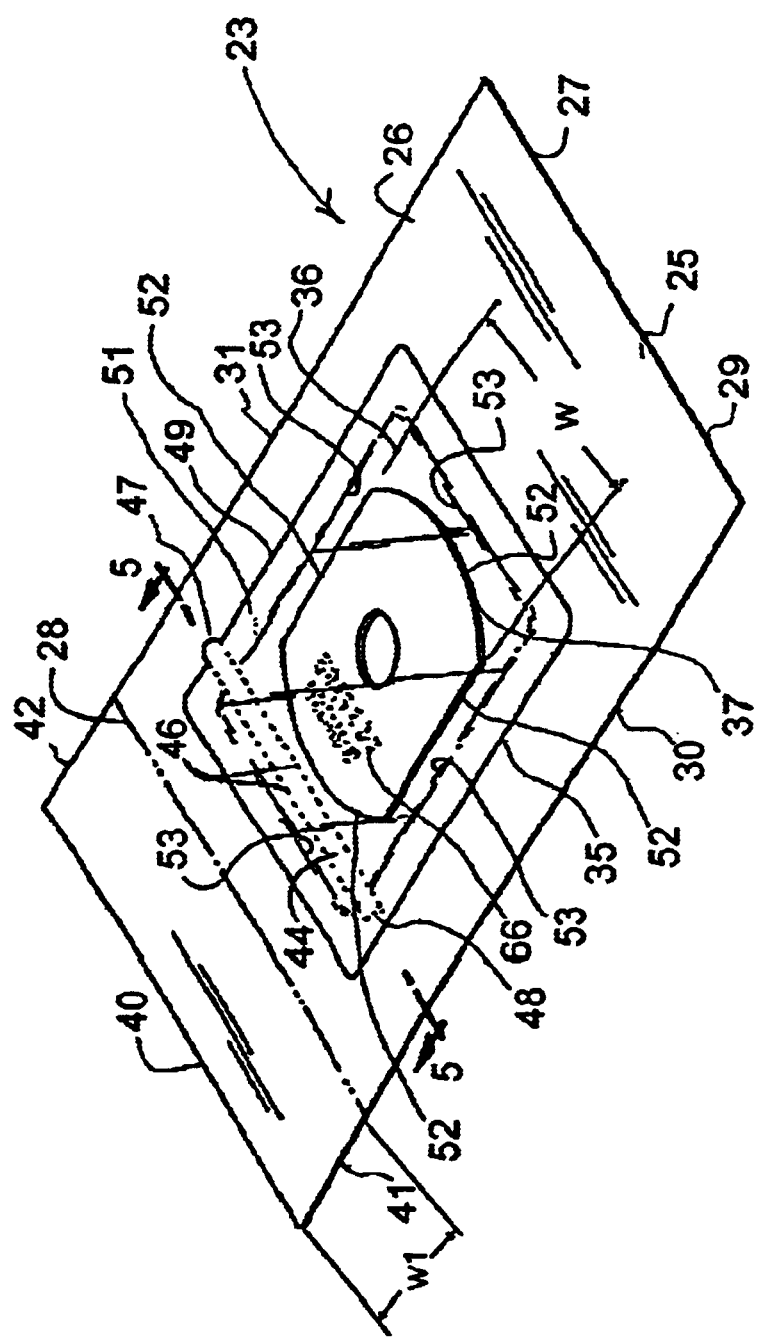
FIG. 3 is a perspective view of a carrier for a storage device for the form of invention shown in FIG. 1.
Figure 4:
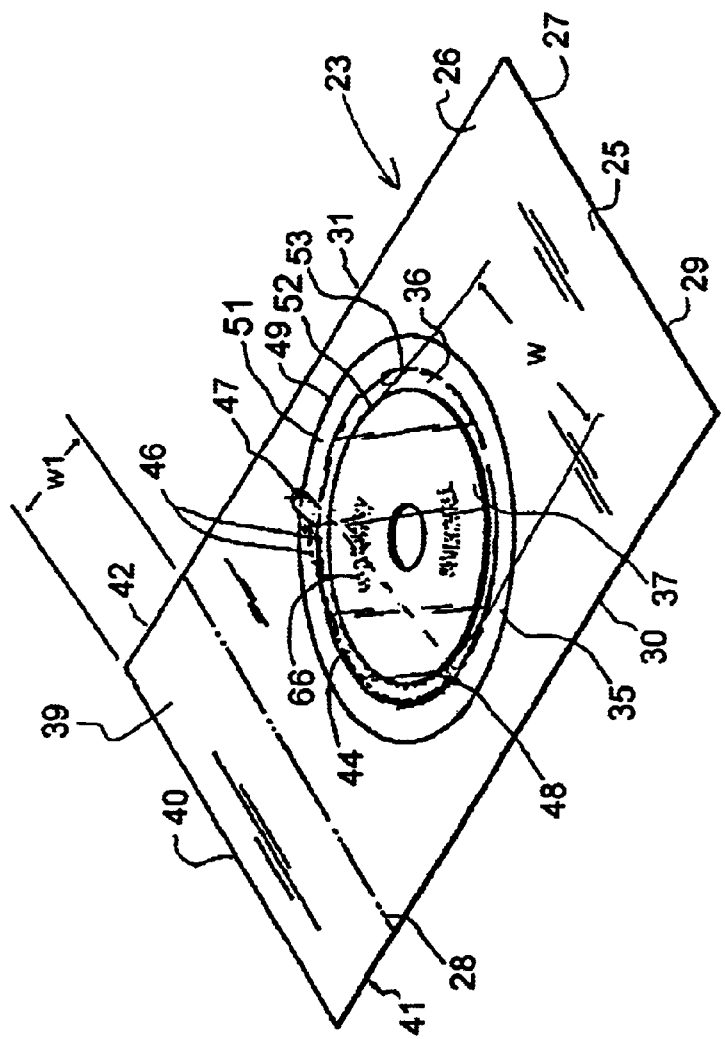
FIG. 4 is a perspective view of an alternate embodiment of the carrier seen in FIG. 3.

The carrier, designated generally 23, is best seen in FIGS. 3 and 4 and is adapted for securement in or on a publication. As seen in FIG. 3, the carrier includes a panel 25 having opposite faces 26 and 27. The panel includes opposite end edges 28, 29 and opposite side edges 30, 31. The panel 25 is generally planar. The faces 26 and 27 are generally parallel and in the illustrated form of FIG. 3, the end edges 28, 29 are generally parallel to one another and the side edges 30, 31 are also generally parallel while the end edges are generally perpendicular to the side edges. While the panel is shown and described as rectangular, other shapes can be used. Preferably, the panel is made out of paper stock. However, the panel can also be flexible plastic. A preferred thickness for the panel is greater than about 0.005 inches and preferably is in the range of between about 0.005 inches and 0.048 inches. The panel 25 is sized and shaped for attachment thereon of a cover 35 to form a pouch 36 for containing therein an information storage unit 37 such as a CD-ROM, DVD, diskette, floppy disk, mini-CD, etc. adapted for the storage of information, graphics, data, software, etc. preferably in digital form.

Extending from one of the edges of the panel 25, e.g., the end edge 28, is a flap 39 having an end edge 40 generally parallel to the end edge 28. The flap also has side edges 41, 42 that are preferably co-extensive with the side edges 30, 31 respectively. In a preferred embodiment of the invention, the flap 39 is integral with the panel 25 and the edge 28 can be in the form of a fold or crease line for a purpose later described. It is to be noted that in certain embodiments a fold line may not be desirable and the end edge 28 would be a zone to be positioned at the edge 15 for securement to the publication 11.

The cover 35 is preferably transparent or translucent and can be made of clear plastic such as polypropylene preferably having thickness in the range of between about 0.002 and about 0.005 inches. It is also preferably flexible and resiliently deformable. More preferably, the thickness of the cover 35 is in the range of between about 0.003 and about 0.005 inches. As seen in FIGS. 3, 4 and 5, a tear strip 44 is provided and in a preferred embodiment is formed by generally concentric (including parallel) rows of perforations 46. The width of the tear strip can be any suitable width as determined by the size of the opening needed or desired. A width greater than about 3/16 inch and preferable in the range of about 3/16 inch to about 1/2 inch is acceptable. The tear strip 44 has a free end 47 and an attached end 48. The free end 47 is in the form of a finger engageable and liftable tab extending beyond, and preferably slightly beyond for example about 1/8 inch to about 1/4 inch, the outer peripheral edge 49 of the cover 35. Adjacent to the peripheral edge 49 and generally concentric (including parallel) therewith is a layer of adhesive 51 which is preferably applied to one face of the cover 35 and corresponds generally in shape with the storage device 37 and is spaced inwardly from the peripheral edge 49 and outwardly of the periphery 52 of the storage device 37 so that when the cover is applied to the panel 25 an unadhered central section forms the pouch 36 with a perimeter 53. The periphery 52 is sized and shaped similar to, but smaller, than the perimeter 53. A substantial portion of the length of the tear strip 44 is located within the perimeter 53, preferably at least 50% more preferably 75% and most preferably 85% of its length. Any suitable adhesive can be used and is preferably a pressure sensitive contact type adhesive that permanently adheres to the panel when the adhesive touches the panel. It is preferred that the adhesive 51 extend substantially around the entirety of the cover 35. It is also preferred that the tab 47 and tear strip 44 be free of adhesive to facilitate its lifting and commencement of severing the tear strip from the cover 35 along the rows of perforations 46 to open the pouch 36 for removal of the storage device 37 therefrom. In order to facilitate operation of the carrier 23 it is preferred that the tear strip 44 be positioned adjacent the peripheral edge 52 of the storage device 37 so that the storage device may be easily removed without further tearing of the cover 37 or of the panel 25 and to provide a large storage pouch. It is also preferred that the tear strip be shaped along its length similar to the shape of the peripheral edge 52 of the storage device 37 adjacent thereto. It is also preferred that at least one edge of an in some embodiments, both edges of the tear strip be located close to, e.g., within 3/4 inch preferably 1/2 inch and most preferably 3/8 inch of the adjacent peripheral edge of the storage unit and preferably located between the perimeter 53 and the periphery 52 when the storage unit moved to the end of the pouch away from the tear strip. As seen in FIG. 3, both edges of the tear strip is positioned adjacent the respective end edge 28 and in FIG. 4 all of one edge and part of the other edge are positioned adjacent the respective end edge. The length of the opening formed by the tear strip can be slightly larger or even slightly less (depending on the amount of stretch or elastically recoverable stretch in the cover material) than the cross width W of the storage device at its maximum width that will be moved through the opening formed by the severed tear strip 44.

FIG. 4 shows an alternate embodiment of carrier which differs from the form shown in FIG. 3 by the shape of the tear strip 44 and the shape of the cover 35. As seen in FIG. 3, the cover 35 is generally rectangular to accommodate such things as a diskette or a shaped CD-ROM that has two rounded ends and two generally parallel side edges. The form of cover 35 and pouch 36 shown in FIG. 4 are generally circular and will accommodate for example, a typical CD-ROM. As seen in FIG. 3, the tear strip 44 is generally straight while the shape of the tear strip 44 in FIG. 4 is arcuate along one edge to allow it to lie generally along and conform generally to the peripheral edge 52 of the CD-ROM and generally straight along the other edge.

As seen in FIGS. 3 and 4, the flaps 39 are generally rectangular and have edges generally parallel and in line with the edges of the panel 25. It is to be understood however that the flap 39 can be other shapes, for example, a smaller ear having cut-out corners, it could also be rounded, scalloped or any other suitable shape that will permit easy handling on the assembly line both for assembly of the carrier and the assembly of the carrier in the publication. It has been found that the width W1 of the flap 39 be at least about 1/2 inch and preferably in the range of between about 1/2 and about 1 inch when it is not a page or cover of the publication.

FIG. 5 shows the tear strip in sectional view showing the unbonded portion of the tab 47 and the bonded peripheral edge margins of the cover 35.

Figure 2:
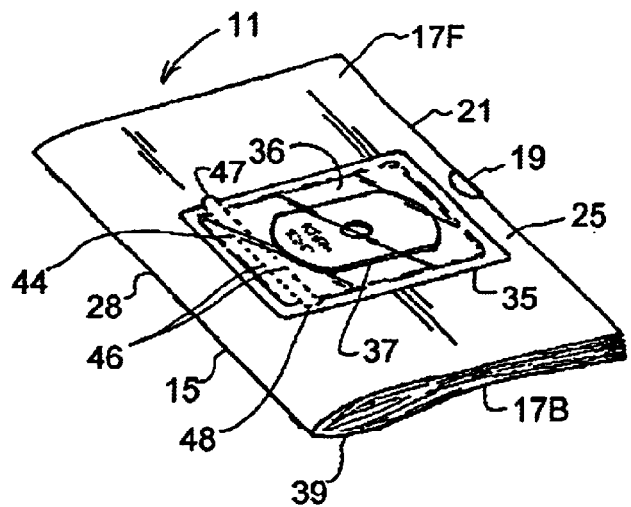
FIG. 2 is a perspective view of an alternate embodiment of the present invention wherein one of the pages of the publication is part of the carrier.

FIGS. 1 and 2 illustrate the publication 11. In the form shown in FIG. 1, the flap 39 is on one side of the edge 28 while the panel 25 is on the other side with the end edge 28 being positioned along the binding edge and can be stapled or glued into place generally through the carrier adjacent the end edge 28. It is to be understood that the carrier 23 could be retained in position by friction if desired. FIG. 2 shows an alternate embodiment of the present invention in which one of the pages of the publication can function as the panel 25 and flap 39. As seen in FIG. 2, the front page 17F is the panel 25 while the back page 17B would be the flap 39 with the edge of the publication 11 being at the end edge 28. One of the advantages of the present invention is that the carrier 23 can be formed at a location different from the binding of the publication 11 and can be shipped in bulk for handling on the publication assembly line. This can help maintain security of the storage units 37 and allow a manufacturer to utilize its current facility without significant modification for the handling of carriers 23.

The carrier 23 is formed by first forming the panel 25 with the flap 39. It is then moved along a production line which is shown schematically in FIG. 6. A feed strip 60 carries a plurality of separated covers 35 adhesive side facing downwardly. The feed strip 60 may be assembled on a roll 62 and simply unrolled above to the production line designated generally 63. The panels 25 with flaps 39 are transported along the production line 63 from a supply 65 thereof and have placed thereon the storage units 37 in a row from a source 64. It is preferred that the indicia 66 or advertising material that is on the storage unit 37 be facing outwardly for viewing thereof through the applied cover. Likewise, indicia or advertising material may be printed or otherwise applied to the panel 25 and/or flap 39 also for viewing along with the storage unit 37. The leading edge 67 of the cover 35 is blown free of the feed strip 60 and is then applied to the panel 25 with the adhesive area being applied outwardly of the periphery of the respective storage unit 37. The remainder of the cover 35 is freed and put into contact with the panel 25. Pressure is applied to the cover 35 as with a roller 59 to ensure bonding to its respective panel 25 after the cover 35 is separated from the feed strip 60, the feed strip may then go to a take up roll 71 The assembled carriers 23 can then be transferred to an assembly line manufacturing the publications or if to be shipped to an assembly line, may then be boxed or otherwise packaged for shipping and then removed from its container at the assembly site. At the location of the assembly of the publication 11, a carrier 23 is fed to the binding line and is positioned between the appropriate pages or in the case of the embodiment shown in FIG. 2 are fed as the cover and back page or can be fed as any other page in the publication as desired. The assembled pages and carrier 23 are then bound together such as by saddle stitching, stapling, gluing or the like with the edge of the publication being generally at the end edge 28. To facilitate assembly of a carrier 23, it is preferred that the carrier 23 be folded or otherwise bent generally along the edge 28 to form a bend between the panel 25 and flap 39. After assembly of the publication 11, if desired, the closure 19 may then be applied or the publication may be otherwise packaged, bagged or the like as desired by the printer.

As various changes could be made in the above constructions without departing from the scope of the invention, it is intended that all matter contained in the above description or shown in the accompanying drawings shall be interpreted as illustrative and not in a limiting sense.

What is claimed:

1. A carrier formed from a panel separate from a cover and adapted for use to attach a storage unit to a printed and bound publication, said carrier comprising:
   a flexible panel having opposite and generally parallel surfaces and a first end edge with opposite ends and at least two opposite side edges with one side edge adjacent each of the ends of the first end edge;
   a flap extending from the first end edge, an attachment area being formed adjacent said first end edge and between the panel and flap;
   a separate flexible cover overlying and secured to a said surface of the panel at a securement area at least partially surrounding a pouch formed between the cover and the panel, with the securement area defining a substantial portion of an outer perimeter of the pouch, the pouch being sized and shaped similar to the size and shape of a storage unit to be contained within the pouch; and
   a tear strip in at least one of the panel and the cover and when severed, operable to form an opening into the pouch for removal of a storage unit therein.

2. A carrier as set forth in claim 1 wherein the tear strip has a generally arcuate edge and is part of the cover.

3. A carrier as set forth in claim 2 wherein at least one edge of the tear strip is positioned adjacent the perimeter of the pouch to facilitate removal of a storage device from the pouch when the tear strip is severed.

4. A carrier as set forth in claim 1 wherein the cover is clear plastic adhesively secured to the panel.

5. A carrier as set forth in claim 4 wherein the pouch perimeter is shaped and sized similar to the size and shape of a periphery of a storage unit to be stored in the pouch.

6. A carrier as set forth in claim 5 wherein the perimeter of the pouch is generally round.

7. A carrier as set forth in claim 1 wherein the panel and the flap are integral.

8. A carrier as set forth in claim 7 including a fold line between the panel and flap.

9. A carrier as set forth in claim 7 wherein the cover is clear plastic and at least one edge of the tear strip is positioned adjacent the perimeter of the pouch to facilitate removal of a storage unit from the pouch when the tear strip is severed.

10. A carrier as set forth in claim 9 in combination with a storage unit contained in the pouch with said storage unit being in contact with the surface of the panel to which the cover is secured.

11. A carrier as set forth in claim 10 in combination with a publication, said carrier being secured to the publication.

12. A carrier as set forth in claim 11 wherein the publication includes a cover and the publication cover is the panel.

13. A carrier as set forth in claim 11 wherein the carrier has a portion thereof positioned between pages of the publication at a bound edge of the publication.

14. A method of assembling a storage unit carrier formed from a panel separate from a cover, said method comprising:
   forming a first panel having generally planar opposite faces and a periphery including at least one end edge;
   forming a flap extending from the panel adjacent a said end edge;
   placing a storage unit on the first panel on one of said opposite faces said storage unit having a periphery; and
   forming a cover separate from the panel and applying the cover over the storage device and securing a peripheral portion of said cover to the panel adjacent to and outwardly of the periphery of the storage unit forming a securement area defining a perimeter of a pouch, said cover including a tear strip with a substantial portion of the length thereof inside of the perimeter portion of the pouch.

15. A method as set forth in claim 14 including moving the cover into place over the panel on a feed strip and transferring a cover from the feed strip to a panel by blowing.

16. A method as set forth in claim 14 including adhesively securing the cover to the panel along the securement area.

17. A method as set forth in claim 16 including forming a tab on one end of the tear strip, said tear strip extending from the perimeter of the pouch to outside of the securement area, at least a portion of said tab not being adhesively secured to the panel.

18. A method as set forth in claim 13 wherein the tear strip is formed adjacent to the perimeter of the pouch such that when separated from the cover forms an opening adjacent to a portion of a peripheral edge of the storage unit and having a length permitting removal of the storage unit from the pouch without substantial damage to the cover or panel.

19. A method as set forth in claim 14 including applying adhesive to the peripheral portion of the cover prior to applying the cover to the panel.

20. A method as set forth in claim 14 wherein the panel includes a page of a publication.

21. A method as set forth in claim 20 wherein the cover is applied to the page prior to binding the page into the publication.

22. A method as set forth in claim 17 wherein the cover is applied to the page after binding the page into the publication.

23. A method as set forth in claim 13 wherein the panel includes paper board and the cover is clear plastic.

24. A carrier formed from a panel separate from a cover and adapted for use to attach a storage unit to a printed and bound publication, said carrier comprising:

a flexible panel having opposite generally planar surfaces, said panel having a first end edge with opposite ends and at least two side edges with each side edge extending from a respective said opposite end, said panel having a flap portion adjacent said first end edge forming an area adapted for binding to a publication;

a separate flexible cover secured to one of said panel surfaces, said cover having at least one peripheral edge and a perimeter portion inwardly of the at least one peripheral edge, a substantial portion of the perimeter portion being bonded to said panel to secure said cover to the panel, said cover having a portion inwardly of the perimeter portion free of securement to the panel and forming a storage pouch therebetween, said perimeter portion defining a substantial portion of a perimeter of the pouch, said cover including a tear strip portion adjacent a said peripheral edge of the cover and extending across at least a portion of the cover and having a finger engaging tab adjacent an end of the tear strip, said tear strip providing an opening into the pouch when separated from the cover; and a storage unit removably contained within said pouch.

25. A carrier as set forth in claim 24 wherein the cover is made of plastic material.

26. A carrier as set forth in claim 25 wherein the tab is not bonded to the panel.

27. A carrier as set forth in claim 26 wherein the tab has a portion extending beyond a peripheral edge of the cover.

28. A carrier as set forth in claim 27 wherein the tear strip is at least partially defined by at least two lines of perforations forming edges of the tear strip when separated from the cover.

29. A carrier as set forth in claim 25 wherein the tear strip is at least partially defined by at least two lines of perforations forming edges of the tear strip when severed from the cover.

30. A carrier as set forth in claim 26 wherein the tear strip extends across a substantial portion of the width of the cover and is positioned over the pouch adjacent an edge portion of the pouch.

31. A carrier as set forth in claim 30 wherein the pouch is sized and shaped similar to the size and shape of the storage unit.

32. A printed publication with a product carrier formed from a panel separate from a cover, said printed publication comprising:

a plurality of bound pages;

a flexible panel secured to said bound pages and having opposite surfaces and a first end edge with opposite ends and at least two opposite side edges with one side edge adjacent each of the ends of the first end edge;

a flap extending from the first end edge, an attachment area being formed adjacent said first end edge and between the panel and flap;

a flexible cover secured to a said surface of the panel at a securement area at least partially surrounding a pouch formed between the cover and the panel with the securement area defining a substantial portion of an outer perimeter of the pouch, the pouch being sized and shaped similar to the size and shape of a storage unit to be contained within the pouch, said cover being separate from the panel prior to being secured to the panel; and a tear strip in the cover and when severed, operable to form an opening into the pouch.

33. A carrier as set forth in claim 32 wherein the tear strip has a generally arcuate edge and is part of the cover.

34. A carrier as set forth in claim 33 wherein at least one edge of the tear strip is positioned adjacent the perimeter of the pouch to facilitate removal of a product from the pouch when the tear strip is severed.

35. A carrier as set forth in claim 32 wherein the cover is clear plastic adhesively secured to the panel.

36. A carrier as set forth in claim 35 wherein the pouch perimeter is shaped and sized similar to the size and shape of a periphery of a product to be stored in the pouch.

37. A carrier as set forth in claim 36 wherein the perimeter of the pouch is generally round.

38. A carrier as set forth in claim 32 wherein the panel and the flap are integral.

39. A carrier as set forth in claim 38 wherein the cover is clear plastic and at least one edge of the tear strip is positioned adjacent the perimeter of the pouch.

40. A carrier as set forth in claim 32 wherein the publication includes a cover and the publication cover is the panel.

* * * * *